(12) United States Patent
Sapp et al.

(10) Patent No.: US 10,627,818 B2
(45) Date of Patent: Apr. 21, 2020

(54) TEMPORAL PREDICTION MODEL FOR SEMANTIC INTENT UNDERSTANDING

(71) Applicant: Zoox, Inc., Menlo Park, CA (US)

(72) Inventors: Benjamin John Sapp, San Francisco, CA (US); Yilun Wang, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 29 days.

(21) Appl. No.: 15/939,192

(22) Filed: Mar. 28, 2018

(65) Prior Publication Data

US 2019/0302767 A1    Oct. 3, 2019

(51) Int. Cl.
| | |
|---|---|
| G05D 1/00 | (2006.01) |
| G06N 20/00 | (2019.01) |
| G05D 1/02 | (2020.01) |
| G06N 5/02 | (2006.01) |
| G01S 17/93 | (2020.01) |
| G01S 17/89 | (2020.01) |
| G01S 17/58 | (2006.01) |
| G08G 1/16 | (2006.01) |

(52) U.S. Cl.
CPC ............ *G05D 1/0088* (2013.01); *G01S 17/58* (2013.01); *G01S 17/89* (2013.01); *G01S 17/936* (2013.01); *G05D 1/0246* (2013.01); *G05D 1/0255* (2013.01); *G05D 1/0257* (2013.01); *G05D 1/0274* (2013.01); *G06N 5/02* (2013.01); *G06N 20/00* (2019.01); *G08G 1/166* (2013.01)

(58) Field of Classification Search
CPC .. G05D 1/0088; G05D 1/0246; G05D 1/0257; G05D 1/0274; G05D 1/0255; G05D 1/0221; G05D 2201/0213; G06N 20/00; G06N 5/02; B60W 30/08; G01S 17/58; G01S 17/89; G01S 17/936; G08G 1/166
See application file for complete search history.

(56) References Cited

U.S. PATENT DOCUMENTS 9,070,101 B2 * 6/2015 Abhyanker .............. G01C 1/00
9,248,834 B1 * 2/2016 Ferguson .............. B60W 30/09
(Continued)

FOREIGN PATENT DOCUMENTS

WO    WO2011015801    2/2011

OTHER PUBLICATIONS

PCT Search Report and Written Opinion dated Jun. 28, 2019 for PCT Application No. PCT/US2019/023920, 14 pages.

*Primary Examiner* — Babar Sarwar
(74) *Attorney, Agent, or Firm* — Lee & Hayes, P.C.

(57) ABSTRACT

A temporal prediction model for semantic intent understanding is described. An agent (e.g., a moving object) in an environment can be detected in sensor data collected from sensors on a vehicle. Computing device(s) associated with the vehicle can determine, based partly on the sensor data, attribute(s) of the agent (e.g., classification, position, velocity, etc.), and can generate, based partly on the attribute(s) and a temporal prediction model, semantic intent(s) of the agent (e.g., crossing a road, staying straight, etc.), which can correspond to candidate trajectory(s) of the agent. The candidate trajectory(s) can be associated with weight(s) representing likelihood(s) that the agent will perform respective intent(s). The computing device(s) can use one (or more) of the candidate trajectory(s) to determine a vehicle trajectory along which a vehicle is to drive.

20 Claims, 5 Drawing Sheets

(56) References Cited

U.S. PATENT DOCUMENTS

| | | |
|---|---|---|
| 9,612,123 B1 | 4/2017 | Levinson et al. |
| 2014/0180914 A1* | 6/2014 | Abhyanker .............. G01C 1/00 705/39 |
| 2017/0329332 A1 | 11/2017 | Pilarski et al. |
| 2018/0345958 A1* | 12/2018 | Lo ........................ G05D 1/0088 |

* cited by examiner

TEMPORAL PREDICTION MODEL FOR SEMANTIC INTENT UNDERSTANDING

BACKGROUND

Existing prediction systems utilize information associated with agents in an environment to infer future trajectories of the agents. However, existing prediction systems are reliant on accurate agent classification (e.g., pedestrian, cyclist, vehicle, etc.) and/or on a naïve assumption of agent dynamics. Inaccurate classification, or the inability to classify an agent (e.g., due to ambiguity and/or insufficient data), can introduce prediction errors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques described herein are directed to utilizing a temporal prediction model for understanding semantic intents of moving objects (e.g., pedestrians, animals, cyclists, other vehicles, etc.) in an environment of a vehicle. For instance, techniques described herein are directed to a framework that maps attributes associated with a moving object in an environment of a vehicle into multiple candidate semantic intents using a temporal prediction model. The vehicle can select and then use a semantic intent to predict how the moving object is likely to behave. That is, a prediction of a behavior of the moving object is not limited to a classification of the moving object, and instead can be based on a variety of information, such as the observed parameters of the moving object and one of many possible "intents" of the moving object. In at least one example, the vehicle can leverage the predicted semantic intent of the moving object to determine how to navigate the vehicle within the environment. For instance, if a moving object is predicted to stop, the vehicle can determine to slow down or navigate around the moving object. Or, if the moving object is predicted to change lanes into a lane of the vehicle, the vehicle can determine to adjust its speed to accommodate the lane change.

As described above, in at least one example, techniques described herein are directed to a framework that maps attributes associated with an agent in an environment of a vehicle into multiple candidate semantic intents using a temporal prediction model. In at least one example, the "moving object" described above can be an agent. That is, an agent can be a pedestrian, an animal, a cyclist, another vehicle, etc. In at least one example, the attributes associated with the agent can be output from a perception system associated with a vehicle. As described below, the perception system can perform agent detection, segmentation, and/or classification based at least in part on sensor data received from sensor system(s) associated with the vehicle. Attributes can include a classification of an agent (and/or a distribution over a plurality of classifications), a position of the agent (e.g., x-coordinate, y-coordinate, angular direction, world coordinates, relative coordinates, etc.), an orientation of the agent (e.g., a roll, a pitch, and/or a yaw), a velocity of the agent, an acceleration of the agent, an extent of the agent (e.g., height, width, etc.), and/or a semantic attribute associated with the agent (e.g., whether the agent is looking down, whether the agent is paying attention, etc.).

In some examples, attributes can be associated with an environment within which the agent and/or vehicle are positioned. In such examples, attributes associated with the environment can be determined by the perception system associated with the vehicle and/or based on map data associated with a map of the environment. For the purpose of this discussion, a map can be any number of data structures modeled in two dimensions or three dimensions that are capable of providing information about an environment, such as, but not limited to, semantic features (e.g., stop regions, light signals (e.g., red, yellow, green, stop, walk, etc.), cross walk locations, speed limit signs, etc.), static features (e.g., buildings, posts, etc.), and/or road topologies (intersections, streets, mountain ranges, roads, terrain, etc.).

In at least one example, the attributes associated with the agent and/or the environment can be provided to a temporal prediction model. The temporal prediction model can analyze the attributes of the agent over time and can generate a discrete set of semantic intents (or, "intent" hereinafter), each which correspond to a candidate trajectory (e.g., a corresponding discrete set of candidate trajectories). An intent can be associated with a potential action of an agent relative to a road, for example. Non-limiting examples of intents can include staying stationary (e.g., not moving), moving in a straight line, moving along a road, changing lanes, following a sidewalk associated with a road, crossing a crosswalk associated with the road, or jaywalking relative to a crosswalk and across the road. Of course, one or more intents can be combined as a single intent and/or additional or alternative intents can be imagined. In at least one example, techniques described herein can assign weights to each of the candidate trajectories. A weight can represent a probability that the agent is going to move consistent with the intent corresponding to a particular candidate trajectory. Weights can be determined based at least in part on attributes associated with the agent and/or environment, as described above.

In at least one example, a candidate trajectory of the discrete set of candidate trajectories can be selected. For instance, a candidate trajectory associated with a weight that satisfies a threshold can be selected from the discrete set of candidate trajectories, a candidate trajectory with a greatest weight can be selected from the discrete set of candidate trajectories, etc. The selected candidate trajectory, which corresponds to a particular intent, can then be provided to a planning system associated with the vehicle. The planning system can determine routes and/or trajectories to use to control the vehicle based at least in part on sensor data received from the sensor system(s). In at least one example, the planning system can leverage the selected candidate trajectory (e.g., that is representative of the behavior of the agent) to determine a trajectory for navigating the vehicle. In at least some examples, all possible candidate trajectories for the agent can be provided to such a planning system. In such an example, the planning system can plan a trajectory for the vehicle to take which considers all possible candidate trajectories, with their respective associated weights.

Techniques described herein enable the prediction of agent behavior without reliance on accurate agent classification. That is, techniques described herein enable a vehicle to predict agent behavior when data is insufficient for classification (e.g., unknown agents) and/or when an agent classification is ambiguous (e.g., a pedestrian is walking their bike, a pedestrian on a skateboard, etc.). Techniques described herein can leverage additional or alternative data sources to more accurately predict agent behavior than in conventional prediction techniques. That is, techniques described herein can lessen opportunities for mis-classification, thereby improving accuracy. Such improved accuracy can further improve safety outcomes. Furthermore, by leveraging the temporal prediction model described herein, techniques described improve upon existing labor intensive (e.g., hard-coded rules) and/or computationally intensive (e.g., end-to-end learning) prediction techniques. For instance, by reducing reliance on hard-coded rules, techniques described herein can reduce memory storage and increase processing speeds.

Figure 1:
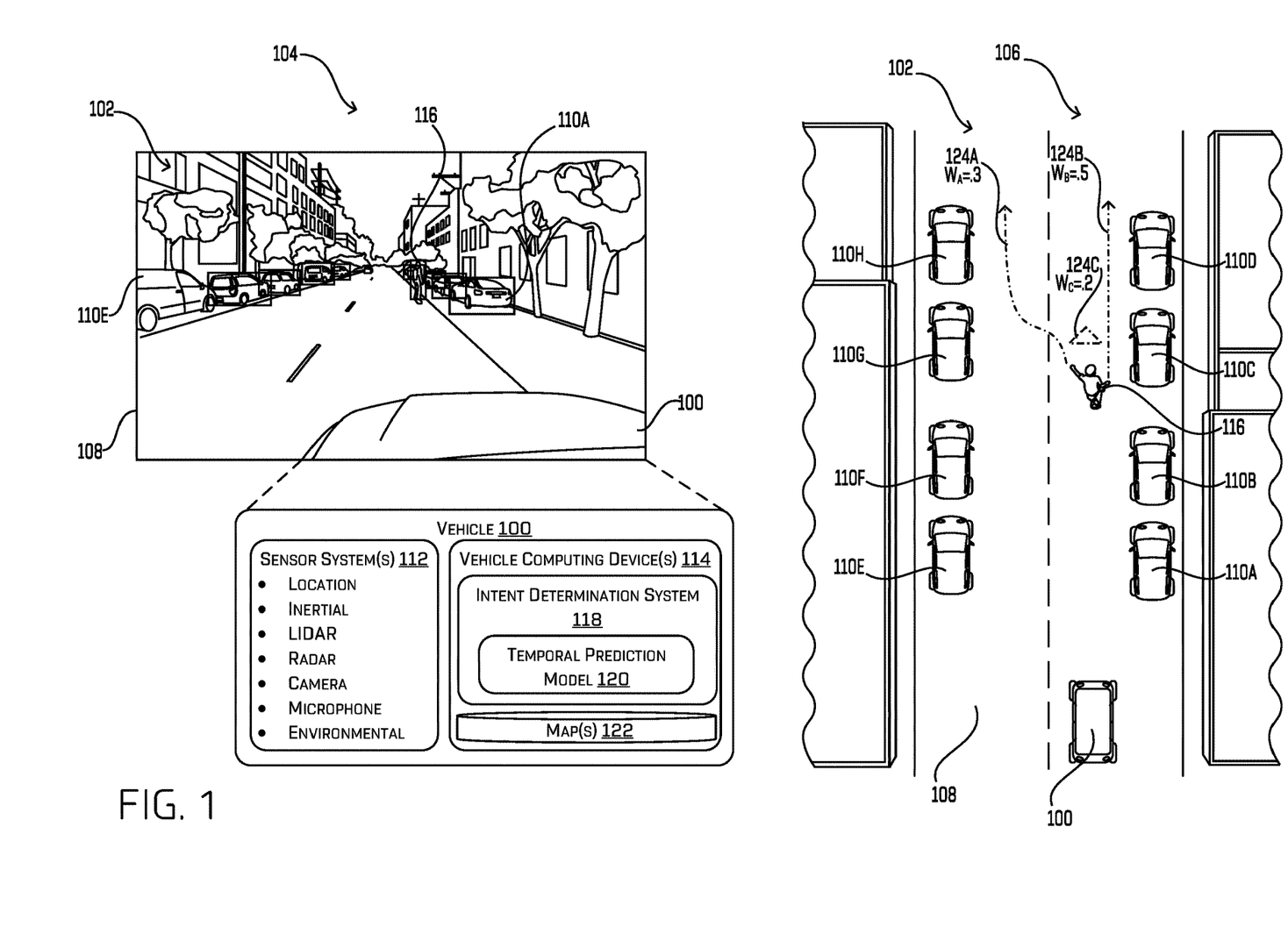
FIG. 1 is a schematic diagram illustrating an example implementation of utilizing a temporal prediction model for semantic intent understanding as described herein.

FIG. 1 is a schematic diagram illustrating an example implementation of utilizing a temporal prediction model for semantic intent understanding as described herein. FIG. 1 illustrates a vehicle 100 positioned in an environment 102. FIG. 1 includes a real-world view 104 of the environment 102 within which the vehicle 100 is driving and an aerial view 106 of the environment 102. In FIG. 1, the vehicle 100 is driving along a road 108, which can be lined with one or more other vehicles 110A-H.

For the purpose of illustration, the vehicle 100 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 100 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 100 are described below.

In at least one example, the vehicle can be associated with sensor system(s) 112 that can be disposed on the vehicle 100. The sensor system(s) 112 can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc.

The sensor system(s) 112 can generate sensor data, which can be utilized by vehicle computing device(s) 114 associated with the vehicle 100.

In at least one example, the vehicle computing device(s) 114 can perform agent detection, segmentation, and/or classification based at least in part on sensor data received from the sensor system(s) 112 associated with the vehicle 100. As illustrated in FIG. 1, the vehicle computing device(s) 114 identified a first agent 116 and one or more second agents corresponding to the one or more vehicles 110A-H along the road 108. The first agent 116, which is a person on a skateboard, can have characteristics of a pedestrian and a vehicle, for example. In at least one example, the vehicle computing device(s) 114 can include an intent determination system 118, which can be used to determine the intents of agents in the environment 102.

In at least one example, the intent determination system 118 can determine attributes associated with each of the agents in the environment 102. For instance, the intent determination system 118 can utilize sensor data (received from the sensor system(s) 112) to determine a classification of the first agent 116 (and/or a distribution (e.g., a probability distribution) over a plurality of classifications), a position of the first agent 116 (e.g., x-coordinate, y-coordinate, angular direction, world coordinates, relative coordinates, etc.), an orientation and/or heading of the agent (e.g., a roll, pitch, or yaw), a velocity of the first agent 116, an acceleration of the first agent 116, an extent of the first agent 116 (e.g., height, weight, etc.), and/or a semantic attribute associated with the first agent 116 (e.g., whether the agent is looking down, whether the agent is paying attention, etc.). Furthermore, in some examples, attributes can be associated with the environment 102. In such examples, attributes associated with the environment 102 can be determined based on sensor data and/or map data associated with a map of the environment 102. The vehicle computing device(s) 114 can store map(s) 122 for determining map data, among other things.

The intent determination system 118 can analyze the attributes associated with the first agent 116 and/or the environment 102, utilizing a temporal prediction model 120, to output one or more intents, which correspond to one or more candidate trajectories. For instance, the intent determination system 118 can utilize one or more mechanisms to generate the one or more intents based at least in part on the attributes. The one or more mechanisms can include hard-coded rules, heatmaps, machine learned models, etc. As described above, an intent can be associated with a potential action of an agent relative to a road, for example. Non-limiting examples of intents can include staying stationary (e.g., not moving), moving in a straight line, moving along the road 108, changing lanes, following a sidewalk associated with a road 108, crossing a crosswalk associated with the road 108, or jaywalking relative to a crosswalk and across the road 108. As a non-limiting example, the intent determination system 118 can determine that an agent is slow moving and proximate a crosswalk, and accordingly, the intent determination system 118 can determine possible crosswalk related semantic intents (e.g., crossing a crosswalk associated with the road 108, or jaywalking relative to a crosswalk and across the road 108, etc.). Additionally or alternatively, if an agent is positioned on the road 108, the intent determination system 118 can determine possible candidate trajectories to enable the agent to move through the environment 102 (e.g., moving in a straight line, moving along the road 108, changing lanes, etc.). In FIG. 1, three candidate trajectories are illustrated: a first candidate trajectory 124A is associated with a lane change intent, a second candidate trajectory 124B is associated with a moving along the road 108 intent, and a third candidate trajectory 124C is associated with a staying stationary intent. Though depicted as only three candidate trajectories in FIG. 1 for illustrative purposes, any number of candidate trajectories can be generated.

In at least one example, the intent determination system 118 can assign weights to each of the candidate trajectories. As shown, each candidate trajectory is associated with a weight: the first candidate trajectory 124A is associated with a weight ($W_A$) of 0.3, the second candidate trajectory 124B is associated with a weight ($W_B$) of 0.5, and a third candidate trajectory 124C is associated with a weight ($W_C$) of 0.2. A weight can represent a probability that the first agent 116 is going to move consistent with the intent corresponding to a particular candidate trajectory. Weights can be determined based at least in part on attributes associated with the agent and/or environment, as described above. In some examples, the intent determination system 118 can utilize a machine learned model to determine a weight for a particular candidate trajectory. Additionally or alternatively, the intent determination system 118 can utilize hard-coded rules to determine weights for candidate trajectories. In at least one example, the intent determination system 118 can refine the candidate trajectories, for instance by generating motion profiles for the candidate trajectories and/or temporally smoothing the weights, as described in additional detail below.

In at least one example, the intent determination system 118 can select a candidate trajectory from the one or more candidate trajectories. For instance, a candidate trajectory that satisfies a threshold can be selected from the one or more candidate trajectories, a candidate trajectory with a greatest weight can be selected from the one or more candidate trajectories, etc. The vehicle computing device(s) 114 can then utilize the selected candidate trajectory to determine a trajectory for navigating the vehicle. In some examples, all candidate trajectories can be provided to the vehicle computing device(s) 114 such that a vehicle trajectory (e.g., a trajectory for navigating the vehicle) is generated based on any number of candidate trajectories and their respective weights.

As illustrated in FIG. 1, the first candidate trajectory 124A associated with the moving along the road 108 intent is the candidate trajectory associated with the greatest weight (0.5). Accordingly, the intent determination system 118 can determine that the first agent 116 is most likely to move along the road 108, consistent with its current behavior. As such, the vehicle computing device(s) 114 can determine a vehicle trajectory (e.g., drive at a same speed, with a same follow distance, etc.) for navigating the vehicle 100 based at least in part on the prediction that the first agent 116 is going to move along the road 108. In an example where the third candidate trajectory 124C is associated with a greatest weight (not shown in FIG. 1), the vehicle computing device(s) 114 could determine a trajectory that would bring the vehicle 100 to a stop. As illustrated, in at least one example, techniques described herein can predict the intent of the first agent 116 without having to classify the first agent 116 and/or without having certainty of the classification of the first agent 116.

While FIG. 1 is directed to determining intents associated with a single agent in the environment 102, in at least one example, the vehicle computing device(s) 114 can determine intents for individual agents in an environment at substantially the same time. Furthermore, in at least one example, the vehicle computing device(s) 114 can determine intents for individual agents in an environment iteratively, which in some examples, can be based on new sensor data as it is determined and/or received.

Figure 2:
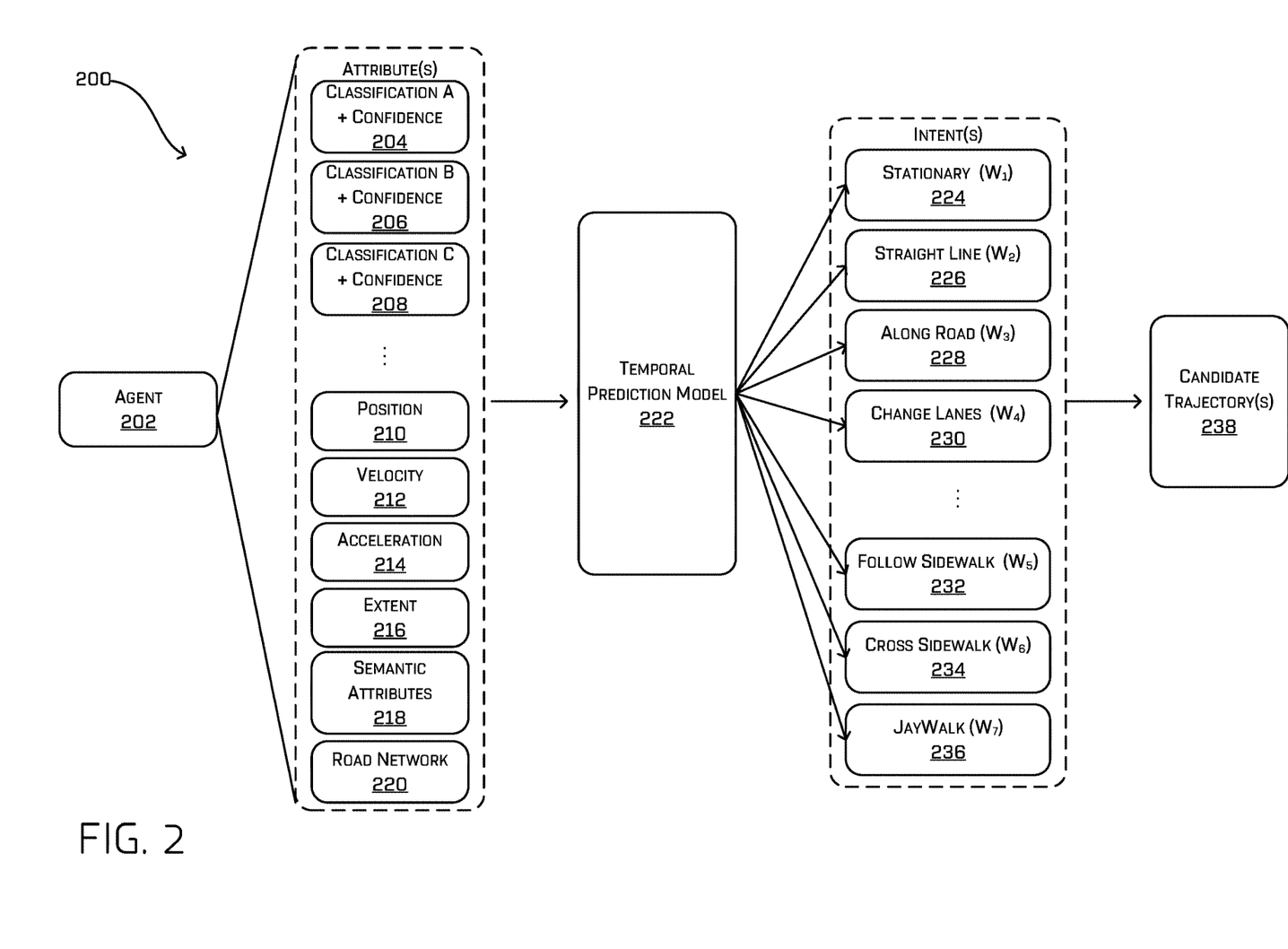
FIG. 2 is a block diagram illustrating an example process for utilizing a temporal prediction model for semantic intent understanding as described herein.

FIG. 2 is a block diagram illustrating an example process 200 for utilizing a temporal prediction model for semantic intent understanding as described herein.

As described above with reference to FIG. 1, in at least one example, vehicle computing device(s) 114 can perform agent detection, segmentation, and/or classification based at least in part on sensor data received from sensor system(s) associated with a vehicle in an environment, such as the vehicle 100 in the environment 102. In at least one example, the vehicle computing device(s) 114 can identify an agent 202. The agent 202 can be a pedestrian, an animal, a cyclist, a vehicle, etc. In at least one example, the intent determination system 118 associated with the vehicle 100 can determine attributes associated with the agent 202. For instance, the intent determination system 118 can utilize sensor data to determine a first classification 204 of the agent 202, a second classification 206 of the agent 202, a third classification 208 of the agent, and so on, a position 210 of the agent 202 (e.g., x-coordinate, y-coordinate, angular direction, world coordinates, relative coordinates, etc.), an orientation and/or heading of the agent (e.g., roll, pitch, and/or yaw), a velocity 212 of the agent 202, an acceleration 214 of the agent 202, an extent 216 of the agent 202 (e.g., height, weight, etc.), and/or a semantic attribute 218 associated with the agent 202 (e.g., whether the agent is looking down, whether the agent is paying attention, etc.). As illustrated in FIG. 2, the intent determination system 118 can determine a distribution over classifications such that the intent determination system 118 can associate a confidence score (e.g., a probability, etc.) that the agent 202 is associated with each classification of one or more classifications. As a non-limiting example, the intent determination system 118 can determine that there is a 0.6 likelihood that the agent is a vehicle, a 0.2 likelihood that the agent is a cyclist, and a 0.2 likelihood that the agent is a pedestrian. In at least one example, such a distribution can comprise an "unknown" or "indeterminate" classification. In such an example, despite not having an affiliated classification (or in such cases where the class not easily distinguishable), attributes can be associated with an agent having an "unknown" classification. In alternate examples, no such "unknown" classification can be used and, instead, the intent determination system 118 can rely on a determination that no one class is associated with a higher probability than any other (within a threshold amount). Furthermore, in some examples, attributes can be associated with the environment 102. In such examples, attributes associated with the environment 102 can be determined based on sensor data and/or map data associated with a map of the environment 102. In at least one example, attributes associated with a road network 220 identified in the map can be determined by the intent determination system 118. As described above, such map data can include indications of semantic features, static features, and/or road topologies.

The intent determination system 118 can analyze the attributes associated with the agent 202 and/or the environment 102, and utilizing a temporal prediction model 222, can output one or more intents, which can correspond with one or more candidate trajectories. As described above, the intent determination system 118 can utilize one or more mechanisms to generate one or more intents based at least in part on the attributes. The one or more mechanisms can include hard-coded rules, heatmaps, machine learned models, etc. Additional details associated with heatmaps can be found in U.S. patent application Ser. No. 15/807,521, filed on Nov. 8, 2017, the entire contents of which are incorporated by reference herein. As described above, an intent can be associated with a potential action of an agent relative to a road, for example. Examples of intents in FIG. 2 include staying stationary 224 (e.g., not moving), moving in a straight line 226, moving along the road 228, changing lanes 230, following a sidewalk associated with a road 232, crossing a crosswalk associated with the road 234, or jaywalking relative to a crosswalk and across the road 236. As described above, any number of intents, which correspond to candidate trajectories, can be generated.

In at least one example, the intent determination system 118 can assign weights to each of the candidate trajectories. As shown, each candidate trajectory is associated with a weight ($W_1$-$W_7$). A weight can represent a probability that the agent 202 is going to move consistent with the intent corresponding to a particular candidate trajectory. Weights can be determined based at least in part on attributes associated with the agent 202 and/or environment 102, as described above. For instance, the intent determination system 118 can assign weights to candidate trajectories based on distributions over classifications. As a non-limiting example, if the agent 202 is associated with a "pedestrian" classification having a greatest confidence score, the weight associated with the candidate trajectory associated with "changing lanes" 230 (e.g., $W_4$) can be lower than if the agent 202 is associated with a "vehicle" classification having a greatest confidence score (e.g., because a person is less likely to change lanes than a vehicle). Weights can be determined based at least in part on attributes associated with the agent and/or environment, as described above. In some examples, the intent determination system 118 can utilize a machine learned model to determine a weight for a particular candidate trajectory. Additionally or alternatively, the intent determination system 118 can utilize hard-coded rules to determine weights for candidate trajectories. In at least one example, the intent determination system 118 can update weights as more information is ingested by the vehicle 100 over time. For example, as position or velocity of the vehicle 100, or the map changes, weights associated with certain candidate trajectories can increase or decrease based on new attributes observed. In at least one example, the intent determination system 118 can refine the candidate trajectories, as described in additional detail below.

In at least one example, the intent determination system 118 can select at least one candidate trajectory 238 from the one or more candidate trajectories. For instance, a candidate trajectory that satisfies a threshold can be selected from the one or more candidate trajectories, a candidate trajectory with a greatest weight can be selected from the one or more candidate trajectories, etc. The vehicle computing device(s) 114 can then utilize the selected candidate trajectory 238 to determine a trajectory for navigating the vehicle 100, as described below.

In some examples, all candidate trajectories can be sent to the vehicle computing device(s) 114 such that a vehicle trajectory can be determined taking all candidate trajectories into account with their respective weights. In some examples, as will be described in more detail below, multiple vehicle trajectories can be calculated in accordance with a receding horizon technique, wherein the vehicle trajectory having the highest confidence is selected to control the vehicle. Such a process for determining candidate trajectories can be performed iteratively (i.e., every fraction of a second, few seconds, etc.) such that candidate trajectories are continually updated as more information about the environment is acquired (e.g., as the agent and vehicle move in the environment).

Figure 3:
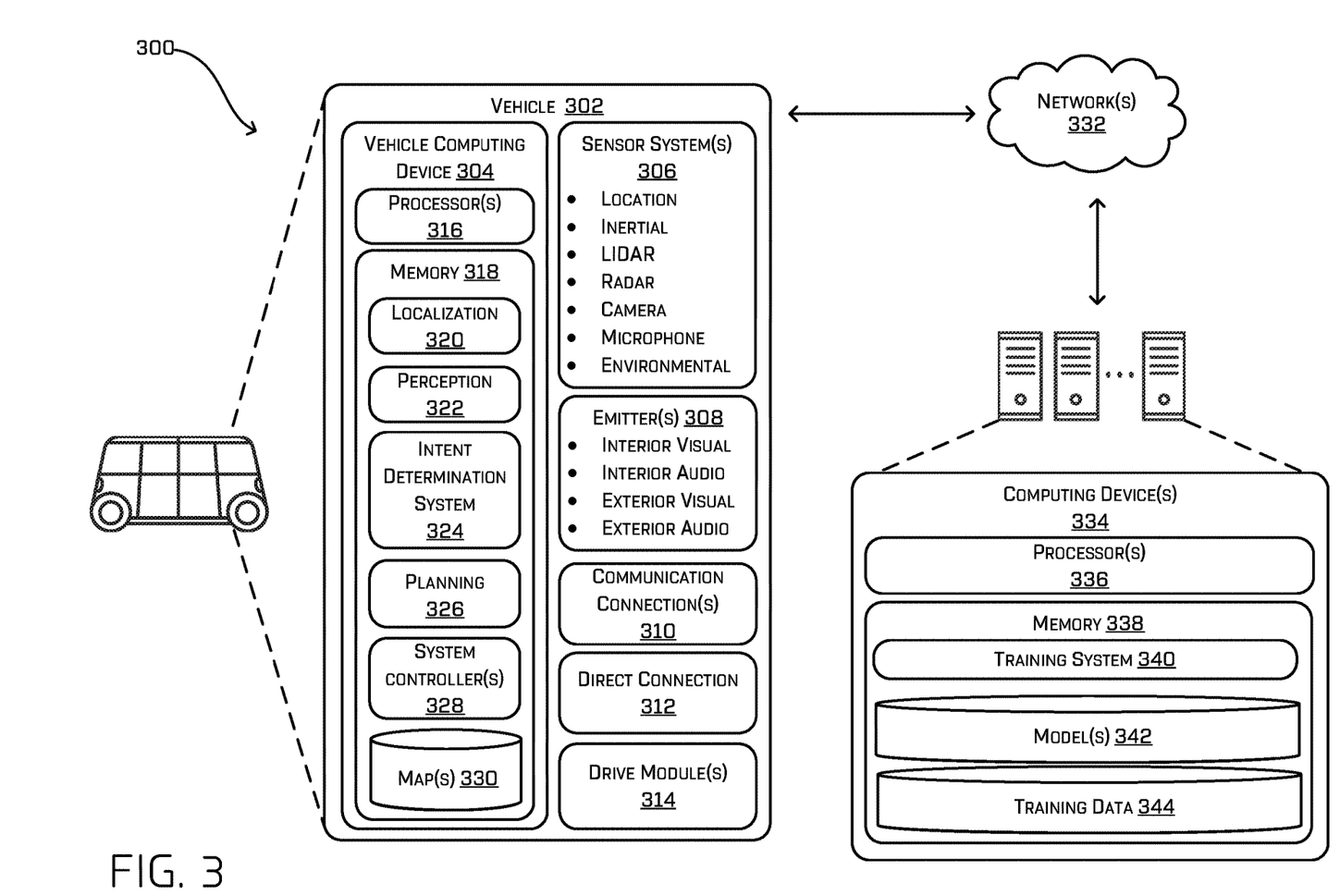
FIG. 3 is a block diagram illustrating an example system for utilizing a temporal prediction model for semantic intent understanding as described herein.

FIG. 3 is a block diagram illustrating an example system 300 for utilizing a temporal prediction model for semantic intent understanding as described herein. In at least one example, the system 300 can include a vehicle 302, which can be the same vehicle as the vehicle 100 described above with reference to FIG. 1. The vehicle 302 can include a vehicle computing device 304, one or more sensor systems 306, one or more emitters 308, one or more communication connections 310, at least one direct connection 312, and one or more drive modules 314. In at least one example, the sensor system(s) 306 can correspond to the sensor system(s) 112 described above with reference to FIG. 1. Further, in at least one example, the vehicle computing device 304 can correspond to the vehicle computing device(s) 114 described above with reference to FIG. 1.

The vehicle computing device 304 can include processor(s) 316 and memory 318 communicatively coupled with the processor(s) 316. In the illustrated example, the vehicle 302 is an autonomous vehicle; however, the vehicle 302 could be any other type of vehicle. In the illustrated example, the memory 318 of the vehicle computing device 304 stores a localization system 320, a perception system 322, an intent determination system 324, a planning system 326, and one or more system controllers 328. Additionally, the memory 318 can store one or more maps 330. In an additional or alternative example, the map(s) can be stored remotely and accessible to the vehicle computing device 304. As described above, a map can be any number of data structures modeled in two dimensions or three dimensions that are capable of providing information about an environment, such as, but not limited to, topologies (such as intersections), streets, mountain ranges, roads, terrain, and the environment in general.

In at least one example, the localization system 320 can determine where the vehicle 302 is in relation to a local and/or global map based at least in part on sensor data received from the sensor system(s) 306 and/or map data associated with a map (e.g., of the map(s) 330). In at least one example, the perception system 322 can perform agent detection, segmentation, and/or classification based at least in part on sensor data received from the sensor system(s) 306. For instance, in at least one example, the perception system 322 can identify agents in the environment within which the vehicle 302 is positioned. In at least one example, the planning system 326 can determine routes and/or trajectories to use to control the vehicle 302 based at least in part on sensor data received from the sensor system(s) 306. Additional details of localizer systems, perception systems, and/or planning systems that are usable can be found in U.S. Pat. No. 9,612,123, issued on Apr. 4, 2017, entitled "Adaptive Mapping to Navigate Autonomous Vehicle Responsive to Physical Environment Changes," and U.S. patent application Ser. No. 15/632,208, filed Jun. 23, 2017, entitled "Trajectory Generation and Execution Architecture," both of which are incorporated herein by reference. In an example where the vehicle 302 is not an autonomous vehicle, one or more of the aforementioned systems components can be omitted from the vehicle 302.

As described above, the memory 318 can include an intent determination system 324. The intent determination system 324 can perform one or more operations as described above with reference to FIGS. 1 and 2. For instance, based at least in part on receiving an indication of an agent in the environment within which the vehicle 302 is positioned, the intent determination system 324 can determine attributes associated with the agent. For instance, the intent determination system 324 can utilize sensor data to determine a distribution over one or more classifications (with associated confidence scores), a position of the agent (e.g., x-coordinate, y-coordinate, angular direction, world coordinates, relative coordinates, etc.), an orientation and/or heading of the agent (a roll, pitch, yaw), a velocity of the agent, an acceleration of the agent, an extent of the agent (e.g., height, weight, etc.), and/or a semantic attribute associated with the agent (e.g., whether the agent is looking down, whether the agent is paying attention, etc.). In some examples, indications of attributes can be received from the perception system 322 and determined based at least in part on such indications. In other examples, the intent determination system 324 can receive raw (e.g., unprocessed) sensor data from the sensor system(s) 306 and can determine the attributes based at least in part on such raw sensor data. Furthermore, in some examples, attributes can be associated with the environment within which the vehicle 302 is positioned. In such examples, the intent determination system 324 can determine attributes associated with the environment based on sensor data and/or map data associated with the map(s) 330. In at least one example, attributes associated with a road network 220 identified in the map can be determined by the intent determination system 324. A non-limiting example of attributes associated with the environment can include semantic attributes (e.g., stop regions, light signals (e.g., red, yellow, green, stop, walk, etc.), cross walks, speed limit signs, informational signs, etc.).

The intent determination system 324 can analyze the attributes associated with the agent and/or the environment, utilizing a temporal prediction model, to output one or more intents which can correspond to one or more candidate trajectories. As described above, the intent determination system 118 can utilize one or more mechanisms to generate one or more intents based at least in part on the attributes. The one or more mechanisms can include hard-coded rules, heatmaps, machine learned models, etc. As described above, an intent can be associated with a potential action of an agent relative to a road, for example. Intents can include, but are not limited to, staying stationary (e.g., not moving), moving in a straight line, moving along the road, changing lanes, following a sidewalk associated with a road, crossing a crosswalk associated with the road, or jaywalking relative to a crosswalk and across the road. As described above, any number of intents can be generated, each corresponding to a candidate trajectory.

In at least one example, the intent determination system 324 can assign weights to each of the candidate trajectories. As described above, a weight can represent a probability that the agent is going to move consistent with the intent corresponding to a particular candidate trajectory. Weights can be determined based at least in part on attributes associated with the agent and/or environment, as described above. For instance, the intent determination system 324 can assign weights to candidate trajectories based on distributions over classifications. Additionally or alternatively, the intent determination system 324 can assign weights based on a relationship between the agent and the road geometry and/or region or symbols (e.g., stop sign, lanes, etc.) associated with an environment, a relationship between the agent and the other agent(s), a compatibility with previously chosen trajectory(s), etc. In at least one example, the intent determination system 324 can assign weights to each of the candidate trajectories utilizing machine learned models (which can include deep learning models) and/or hard-coded rules. In at least one example, the intent determination system 324 can update weights as more information is ingested by the vehicle 302 over time. For example, as position or velocity of the vehicle 302, or the map changes, weights associated with certain candidate trajectories can increase or decrease based on new attributes observed.

In at least one example, the intent determination system 324 can refine the candidate trajectories. For instance, in at least one example, the intention determination system 324 can generate motion profiles associated with each candidate trajectory, indicating how the agent is likely to move along a particular candidate trajectory over time. In such an example, the intent determination system 324 can utilize a constant velocity model and/or one or more other rules (e.g., decelerate at known stop-line/region as indicated in the map data, converge-to-lane center, etc.) to generate motion profiles. In an additional or alternative example, the intent determination system 324 can utilize one or more machine learned models to generate motion profiles.

Furthermore, in at least one example, the intent determination system 324 can temporally smooth weights associated with the candidate trajectories using one or more probabilistic models (e.g., hidden Markov model, conditional random fields, etc.). For instance, in an example, the intent determination system 324 can generate a first set of candidate trajectories, associated with a first timestamp, and a second set of candidate trajectories, associated with a second timestamp. The intent determination system 324 can utilize the one or more probabilistic models to smooth weights between the first set of candidate trajectories and the second set of candidate trajectories. Such a process can be performed iteratively from one measurement period to the next to continuously smooth the weights.

In at least one example, the intent determination system 324 can select a candidate trajectory from the one or more candidate trajectories. For instance, a candidate trajectory that satisfies a threshold can be selected from the one or more candidate trajectories, a candidate trajectory with a greatest weight can be selected from the one or more candidate trajectories, etc. The intent determination system 324 can then provide the selected candidate trajectory to the planning system 326 which can determine a trajectory for navigating the vehicle 302.

In some examples, the intent determination system 324 can provide all candidate trajectories and/or associated weights to the planning system 326. In at least one such example, the planning system 326 can provide the vehicle 302 a trajectory which accounts for all possible candidate trajectories of the agent.

In at least one example, the localization system 320, the perception system 322, and/or the planning system 326 can process sensor data, as described above, and can send their respective outputs over network(s) 332, to computing device(s) 334. In at least one example, the localization system 320, the perception system 322, and/or the planning system 326 can send their respective outputs to the computing device(s) 334 at a particular frequency, after a lapse of a predetermined period of time, in near real-time, etc. Additionally, in at least one example, the intent determination system 324 can send candidate trajectories and associated weights to the computing device(s) 334 at a particular frequency, after a lapse of a predetermined period of time, in near real-time, etc.

In at least one example, the vehicle computing device 304 can include one or more system controllers 328, which can be configured to control steering, propulsion, braking, safety, emitters, communication, and other systems of the vehicle 302. These system controller(s) 328 can communicate with and/or control corresponding systems of the drive module(s) 314 and/or other components of the vehicle 302.

In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally or alternatively, the sensor system(s) 306 can send sensor data, via the network(s) 332, to the computing device(s) 334 at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitters can be disposed at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device 304 to another computing device or a network, such as network(s) 332. For example, the communications connection(s) 310 can enable Wi-Fi-based communication such as via frequencies defined by the IEEE 802.11 standards, short range wireless frequencies such as BLUETOOTH™, or any suitable wired or wireless communications protocol that enables the respective computing device to interface with the other computing device(s).

In at least one example, the vehicle 302 can include drive module(s) 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include sensor system(s) to detect conditions of the drive module(s) 314 and/or the surroundings of the vehicle 302. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 314. Furthermore, the drive module(s) 314 also include communication connection(s) that enable communication by the respective drive module with other local or remote computing device(s).

As described above, the vehicle 302 can send sensor data to computing device(s) 334, via the network(s) 332. In some examples, the vehicle 302 can send raw sensor data to the computing device(s) 334. In other examples, the vehicle 302 can send processed sensor data and/or representations of sensor data to the computing device(s) 334. In some examples, the vehicle 302 can send sensor data to the computing device(s) 334 at a particular frequency, after a lapse of a predetermined period of time, in near real-time, etc. Additionally, in at least one example, the vehicle 302 can send candidate trajectories and/or weights associated with the candidate trajectories to the computing device(s) 334 after a lapse of a predetermined period of time, in near real-time, etc.

The computing device(s) 334 can receive the sensor data (raw or processed) and/or candidate trajectories and associated weights, and can train data models based on the sensor data (raw or processed) and/or candidate trajectories and associated weights. In at least one example, the computing device(s) 334 can include processor(s) 336 and memory 338 communicatively coupled with the processor(s) 336. In the illustrated example, the memory 338 of the computing device(s) 334 stores a training system 340, a model(s) database 342, and a training data database 344.

The training system 340 can generate one or more machine learned models. In at least one example, sensor data can be input into a machine learned model. Such a machine learned model can be used for determining weights for weighting one or more candidate trajectories. As a non-limiting example, attributes associated with an agent can be input into an artificial neural network (ANN), the output of which can indicate a weight associated with a candidate trajectory, as described above. In at least one example, the sensor data input into the ANN can indicate attributes associated with an agent, candidate trajectories determined based on the attributes, weights associated with such candidate trajectories, and the actual trajectory along which the agent moved. The input data can be analyzed by the ANN to generate a machine learned model that leverages similar information to determine weights for candidate trajectories. That is, the machine learned model can output one or more weights respectively corresponding to one or more candidate trajectories.

Although discussed in the context of neural networks, any type of machine learning can be used consistent with this disclosure. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, the one or more machine learned models can be trained and stored in the model(s) data store 342. In some examples, the one or more machine learned models can be stored on and/or accessible to the vehicle computing device 304 for use by one or more of the systems associated with the vehicle computing device 304 in near-real time.

The training data data store 344 can store sensor data (raw or processed) received from one or more vehicles, such as vehicle 302. The sensor data in the training data data store 344 can represent sensor data collected by one or more onboard sensor systems (e.g., such as onboard sensor system(s) 306), or other sensor system(s), at previous time(s) (e.g., previously connected sensor data). Additionally, in at least one example, candidate trajectories predicted for an agent, weights associated with the candidate trajectories, and an actual trajectory along which the agent moved can be stored in the training data data store 344. In at least one example, the training system 340 can access the training data data store 344 for generating the machine learned model(s).

The processor(s) 316 of the vehicle 302 and the processor(s) 336 of the computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. Memory 318 and 338 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 334 and/or components of the computing device(s) 334 can be associated with the vehicle 302. That is, the vehicle 302 can perform one or more of the functions associated with the computing device(s) 334, and vice versa.

Figure 4:
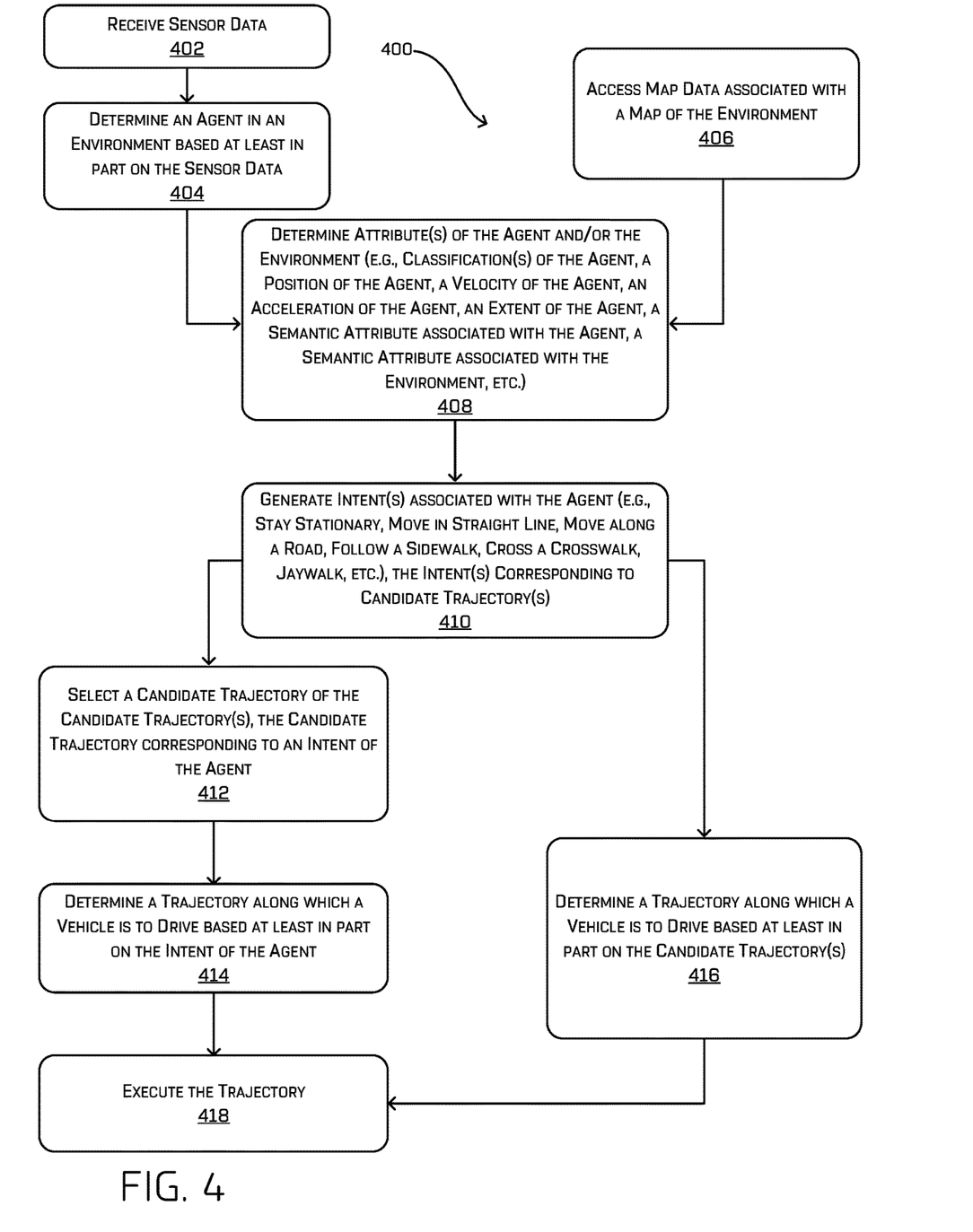
FIG. 4 is a flowchart illustrating an example method for determining a trajectory utilizing a temporal prediction model for semantic intent understanding as described herein.
Figure 5:
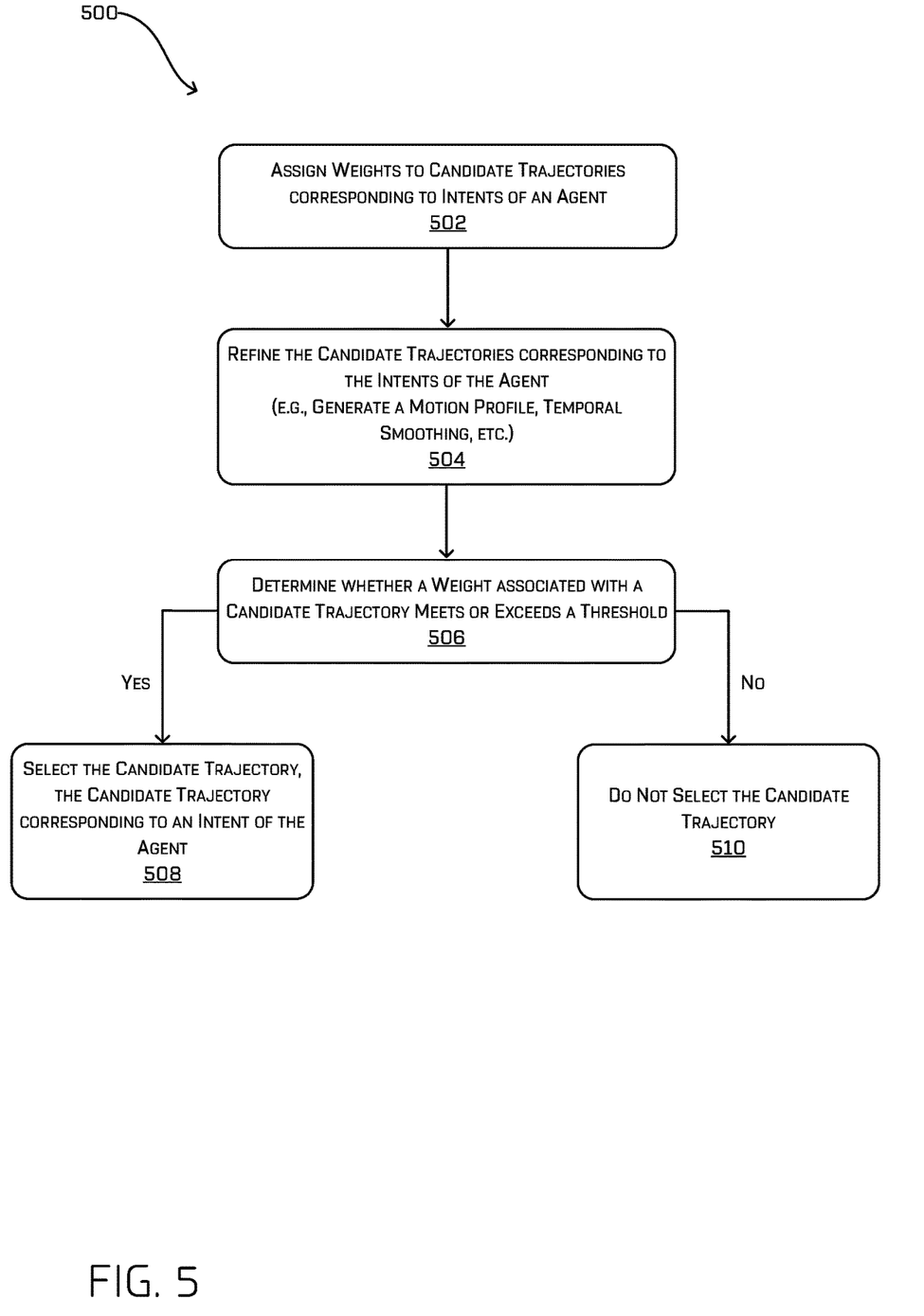
FIG. 5 is a flowchart illustrating an example method for selecting a candidate trajectory utilizing a temporal prediction model for semantic intent understanding as described herein.

FIGS. 4 and 5 are flowcharts showing example methods involving using a temporal prediction model for semantic intent understanding as described herein. The methods illustrated in FIGS. 4 and 5 are described with reference to the vehicle 302 shown in FIG. 3 for convenience and ease of understanding. However, the methods illustrated in FIGS. 4 and 5 are not limited to being performed using vehicle 302 shown in FIG. 3, and can be implemented using any of the other vehicles described in this application, as well as vehicles other than those described herein. Moreover, the vehicle 302 described herein is not limited to performing the methods illustrated in FIGS. 4 and 5.

The methods 400 and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400 and 500 can be combined in whole or in part with each other or with other methods.

FIG. 4 is a flowchart illustrating an example method 400 for determining a trajectory utilizing a temporal prediction model for semantic intent understanding as described herein.

Block 402 illustrates receiving sensor data. As described above, a vehicle 302 can include sensor system(s) 306. In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can provide input to the vehicle computing device 304. In at least one example, the vehicle computing device 304 can receive the input for processing by the localization system 320, the perception system 322, the intent determination system 324, and/or the planning system 326. In at least one example, the perception system 322 can determine an agent in an environment of the vehicle 302, as illustrated in block 404.

Block 406 illustrates accessing map data associated with a map of the environment. As described above, in at least one example, the vehicle computing device 304 can store one or more maps 330. In an additional or alternative example, the map(s) can be stored remotely and accessible to the vehicle computing device 304. As described above, a map can be any number of data structures modeled in two dimensions or three dimensions that are capable of providing information about an environment, such as, but not limited to, semantic features, static features, and/or road topologies. In at least one example, the vehicle computing device 304 can access map data associated with the map(s) 330 for processing by the localization system 320, the perception system 322, the intent determination system 324, and/or the planning system 326.

Block 408 illustrates determining attribute(s) of the agent and/or the environment. In at least one example, the intent determination system 324 can access the sensor data and/or the map data and can determine one or more attributes associated with an agent and/or the environment. For instance, the intent determination system 324 can utilize sensor data to determine a distribution (e.g., a probability distribution) over one or more classifications (with associated confidence scores), a position of the agent (e.g., x-coordinate, y-coordinate, angular direction, world coordinates, relative coordinates, etc.), an orientation and/or heading of the agent (e.g., roll, pitch, and/or yaw), a velocity of the agent, an acceleration of the agent, an extent of the agent (e.g., height, weight, etc.), and/or a semantic attribute associated with the agent (e.g., whether the agent is looking down, whether the agent is paying attention, etc.). In some examples, indications of attributes can be received from the perception system 322 and determined based at least in part on such indications. In other examples, the intent determination system 324 can receive raw (e.g., unprocessed) sensor data from the sensor system(s) 306 and can determine the attributes based at least in part on such raw sensor data. Furthermore, in some examples, attributes can be associated with the environment within which the vehicle 302 is positioned. In such examples, the intent determination system 324 can determine attributes associated with the environment based on sensor data and/or map data associated with the map(s) 330. In at least one example, attributes associated with a road network 220 identified in the map can be determined by the intent determination system 324. A non-limiting example of attributes associated with the environment proximate the vehicle (e.g., as can be determined based on a localization operation with respect to a map) can include semantic attributes (e.g., stop regions, light signals (e.g., red, yellow, green, stop, walk, etc.), cross walks, speed limit signs, informational signs, etc.).

Block 410 illustrates generating intents(s) corresponding to candidate trajectory(s) associated with the agent. The intent determination system 324 can analyze the attributes associated with the agent and/or the environment, utilizing a temporal prediction model, to output one or more intents, which can correspond to one or more candidate trajectories. As described above, the intent determination system 118 can utilize one or more mechanisms to generate one or more intents based at least in part on the attributes. The one or more mechanisms can include hard-coded rules, heatmaps, machine learned models, etc. As described above, an intent can be associated with a potential action of an agent relative to a road, for example. Intents can include, but are not limited to, staying stationary (e.g., not moving), moving in a straight line, moving along the road, changing lanes, following a sidewalk associated with a road, crossing a crosswalk associated with the road, or jaywalking relative to a crosswalk and across the road. As described above, any number of intents, which each correspond to a candidate trajectory, can be generated.

Block 412 illustrates selecting a candidate trajectory of the candidate trajectory(s), the candidate trajectory corresponding to an intent of the agent. In at least one example, the intent determination system 324 can select a candidate trajectory of the candidate trajectory(s). Additional details associated with such a selection are described below with reference to FIG. 5. The intent determination system 324 can then provide the selected candidate trajectory to the planning system 326 which can determine a trajectory for navigating the vehicle 302, as illustrated in block 414. In some examples, block 412 can be omitted such that all candidate trajectories (and their respective weights) are sent directly to the planning system 326, which can determine a trajectory along which the vehicle is to drive, as illustrated in block 416.

Block 418 illustrates executing the trajectory. In at least one example, the one or more system controllers 328 can be configured to control steering, propulsion, braking, safety, emitters, communication, and other systems of the vehicle 302 to navigate the vehicle 302 along the trajectory. These system controller(s) 328 can communicate with and/or control corresponding systems of the drive module(s) 314 and/or other components of the vehicle 302 such to cause the vehicle 302 to drive along the trajectory (e.g., execute the trajectory).

As described above, the method 400 described above can be performed in association with individual agents in an environment substantially simultaneously, and, in some examples, can be performed iteratively.

FIG. 5 is a flowchart illustrating an example method 500 for selecting a candidate trajectory utilizing a temporal prediction model for semantic intent understanding as described herein.

Block 502 illustrates assigning weights to candidate trajectories associated with intents of an agent. The intent determination system 324 can analyze the attributes associated with the agent and/or the environment, utilizing a temporal prediction model, to output one or more candidate trajectories. As described above, in at least one example, the intent determination system 324 can assign weights to each of the candidate trajectories. A weight can represent a probability that the agent is likely to move consistent with the intent corresponding to a particular candidate trajectory. Weights can be determined based at least in part on attributes associated with the agent and/or environment, as described above. For instance, the intent determination system 324 can assign weights to candidate trajectories based on distributions over classifications. Additionally or alternatively, the intent determination system 324 can assign weights based on a relationship between the agent and the road geometry, a relationship between the agent and the other agent(s), a compatibility with previously chosen trajectory(s), etc. In at least one example, the intent determination system 324 can assign weights to each of the candidate trajectories utilizing machine learned models (which can include deep learning models) and/or hard-coded rules. As described above, in some examples, weights can be updated over time.

Block 504 illustrates refining the candidate trajectory. In at least one example, the intent determination system 324 can refine the candidate trajectories. For instance, in at least one example, the intention determination system 324 can generate motion profiles associated with each candidate trajectory, indicating how the agent is likely to move along a particular candidate trajectory over time. In such an example, the intent determination system 324 can utilize a constant velocity model and/or one or more other rules (e.g., decelerate at known stop-line/region as indicated in the map data, converge-to-lane center, etc.) to generate motion profiles. In an additional or alternative example, the intent determination system 324 can utilize one or more machine learned models to generate motion profiles.

Furthermore, in at least one example, the intent determination system 324 can temporally smooth weights associated with the candidate trajectories using one or more probabilistic models (e.g., hidden Markov model, conditional random fields, etc.). For instance, in an example, the intent determination system 324 can generate a first set of candidate trajectories, associated with a first timestamp, and a second set of candidate trajectories, associated with a second timestamp. The intent determination system 324 can utilize the one or more probabilistic models to smooth weights between the first set of candidate trajectories and the second set of candidate trajectories.

Block 506 illustrates determining whether a weight associated with a candidate trajectory satisfies a threshold. In at least one example, the intent determination system 324 can access a candidate trajectory and corresponding weight, and can compare the weight with a threshold. Based at least in part on the weight satisfying the threshold, the intent determination system 324 can select the associated candidate trajectory, as illustrated in block 508. In an example, a weight can satisfy a threshold based at least in part on meeting or exceeding a threshold. In additional or alternative examples, a weight can satisfy a threshold by being less than a threshold. As described above, the candidate trajectory can be associated with an intent of the agent and can be utilized for determining a trajectory along which a vehicle (e.g., vehicle 302) is to drive. Based at least in part on the weight not satisfying the threshold, the intent determination system 324 can refrain from selecting the candidate trajectory, as illustrated in block 510.

While FIG. 5 is directed to an example where a candidate trajectory is selected based on an associated weight satisfying a threshold, in additional or alternative examples, the candidate trajectory can be selected based on the associated weight being associated with a greatest weight, or by another metric.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A. A system associated with predicting an intent of an object in an environment proximate an autonomous vehicle, the system comprising: one or more sensors, wherein the one or more sensors on the autonomous vehicle; one or more processors; and one or more non-transitory computer-readable media storing instructions executable by the one or more processors, wherein the instructions, when executed, cause the one or more processors to perform actions comprising: receiving sensor data from the one or more sensors; detecting, based at least in part on a portion of the sensor data, the object in the environment; determining, based at least in part on the sensor data, an attribute of the object, the attribute comprising a classification distribution of the object, a position of the object, an orientation of the object, or a velocity of the object; generating, based at least in part on the attribute and using a machine learned model, a set of intents; associating, based at least in part on the attribute, one or more weights with a subset of intents, the subset of intents corresponding to a subset of candidate trajectories; determining a weight associated with a candidate trajectory of the subset of candidate trajectories meets or exceeds a threshold, the candidate trajectory corresponding to the intent; and determining a vehicle trajectory along which the autonomous vehicle is to drive based at least in part on the intent of the object.

B. The system as paragraph A recites, wherein the one or more sensors comprise at least a light detection and ranging (LIDAR) sensor, a radio detection and ranging (RADAR)

sensor, a sound navigation and ranging (SONAR) sensor, a location sensor, an inertial sensor, a camera, a microphone, or an environment sensor.

C. The system as paragraph A or B recites, the actions further comprising accessing map data associated with a map of the environment, wherein the attribute further comprises at least a portion of the map data.

D. The system as any of paragraphs A-C recite, wherein the classification distribution comprises a vehicle class, a pedestrian class, or a bicycle class.

E. The system as any of paragraphs A-D recite, wherein the intent of the object comprises: staying stationary; moving in a straight line; moving along the road; changing lanes; following a sidewalk associated with the road; crossing a crosswalk associated with the road; or jaywalking relative to the crosswalk and across the road.

F. A method comprising: receiving sensor data from one or more sensors; determining, based at least in part on a portion of the sensor data, an object in an environment; determining, based at least in part on the sensor data, one or more attributes of the object; generating, based at least in part on the one or more attributes and a prediction model, a set of intents corresponding to a set of candidate trajectories; determining, based at least in part on the one or more attributes, a candidate trajectory of the set of candidate trajectories, the candidate trajectory corresponding to an intent of the object; and determining a vehicle trajectory along which a vehicle is to drive based at least in part on the intent of the object.

G. The method as paragraph F recites, wherein the one or more attributes comprise: a classification distribution of the object; a position of the object; an orientation of the object; a heading of the object; a velocity of the object; an acceleration of the object; an extent of the object; or a semantic attribute associated with the object.

H. The method as paragraph G recites, wherein the classification distribution comprises a probability distribution over a vehicle class, a pedestrian class, or a bicycle class.

I. The method as any of paragraphs F-H recite, further comprising accessing map data associated with a map of the environment, wherein the one or more attributes further comprise at least a portion of the map data.

J. The method as any of paragraphs F-I recite, further comprising associating, based at least in part on the one or more attributes, one or more weights with the set of candidate trajectories.

K. The method as paragraph J recites, wherein associating the one or more weights with the set of candidate trajectories is based at least in part on a machine learned model.

L. The method as any of paragraphs F-K recite, wherein the set of intents of the object comprises: staying stationary; moving in a straight line; moving along the road; changing lanes; following a sidewalk associated with the road; crossing a crosswalk associated with the road; or jaywalking relative to the crosswalk and across the road.

M. The method as any of paragraphs F-L recite, further comprising refining a subset of the set of candidate trajectories based at least in part on determining one or more motion profiles.

N. The method as any of paragraphs F-M recite, further comprising, associating, based at least in part on the one or more attributes, one or more weights with the set of candidate trajectories, wherein the weights are smoothed according to a probabilistic temporal smoothing model.

O. The method as any of paragraphs F-N recite, wherein the vehicle is an autonomous vehicle, and the method further comprises executing, by a computing device associated with the autonomous vehicle, the trajectory to cause the autonomous vehicle to drive along the trajectory.

P. A non-transitory computer-readable medium having a set of instructions that, when executed, cause one or more processors to perform operations comprising: receiving, from one or more sensors, sensor data associated with an environment; determining, based at least in part on the sensor data, an object in an environment; determining, based at least in part on the sensor data, a plurality of attributes of the object or the environment; determining, based at least in part on the plurality of attributes and a machine learned model, a set of intents of the object corresponding to a set of candidate trajectories; associating a set of weights with the set of candidate trajectories; selecting, based at least in part on the set of weights associated with the set of candidate trajectories, one or more candidate trajectories of the set of candidate trajectories; and determining, based at least in part on the one or more candidate trajectories, a vehicle trajectory along which a vehicle is to drive.

Q. The non-transitory computer-readable medium as paragraph P recites, wherein the plurality of attributes comprises a classification distribution and one or more of: a position of the object; an orientation of the object; a heading of the object; a velocity of the object; an acceleration of the object; an extent of the object; a semantic attribute associated with the object; or a semantic attribute associated with the environment.

R. The non-transitory computer-readable medium as paragraph Q recites, the operations further comprising accessing map data associated with a map of the environment, wherein the plurality of attributes further comprises the map data and the map data comprises at least one of semantic features, static structures, or road topologies.

S. The non-transitory computer-readable medium as any of paragraphs P-R recite, the operations further comprising smoothing the set of weights based at least in part on a probabilistic temporal smoothing model.

T. The non-transitory computer-readable medium as any of paragraphs P-S recite, wherein the set of intents comprise: staying stationary; moving in a straight line; moving along the road; changing lanes; following a sidewalk associated with the road; crossing a crosswalk associated with the road; or jaywalking relative to the crosswalk and across the road.

While paragraphs A-E are described above with respect to a system, it is understood in the context of this document that the content of paragraphs A-E may also be implemented via a method, device, and/or computer storage media. While paragraphs F-O are described above with respect to a method, it is understood in the context of this document that the content of paragraphs F-O may also be implemented via a system, device, and/or computer storage media. While paragraphs P-T are described above with respect to a non-transitory computer-readable medium, it is understood in the context of this document that the content of paragraphs P-T may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system associated with predicting an intent of an object in an environment proximate an autonomous vehicle, the system comprising:
    one or more sensors, wherein the one or more sensors are associated with the autonomous vehicle;
    one or more processors; and
    one or more non-transitory computer-readable media storing instructions executable by the one or more processors, wherein the instructions, when executed, cause the system to perform actions comprising:
        receiving sensor data from the one or more sensors;
        detecting, based at least in part on a portion of the sensor data, the object in the environment;
        determining, based at least in part on the sensor data, at least one attribute of the object, the at least one attribute comprising a classification distribution of the object indicating individual probabilities that the object is associated with individual classes of a plurality of classes;
        generating, based at least in part on the attribute and using a machine learned model, a set of intents;
        associating, based at least in part on the attribute, one or more weights with a subset of intents, the subset of intents corresponding to a subset of candidate trajectories;
        determining a weight associated with a candidate trajectory of the subset of candidate trajectories meets or exceeds a threshold, the candidate trajectory corresponding to the intent; and
        determining a vehicle trajectory along which the autonomous vehicle is to drive based at least in part on the intent of the object.

2. The system as claim 1 recites, wherein the one or more sensors comprise at least a light detection and ranging (LIDAR) sensor, a radio detection and ranging (RADAR) sensor, a sound navigation and ranging (SONAR) sensor, a location sensor, an inertial sensor, a camera, a microphone, or an environment sensor.

3. The system as claim 1 recites, the actions further comprising accessing map data associated with a map of the environment, wherein the at least one attribute further comprises at least a portion of the map data.

4. The system as claim 1 recites, wherein the plurality of classes comprise at least a vehicle class, a pedestrian class, or a bicycle class.

5. The system as claim 1 recites, wherein the intent of the object comprises:
    staying stationary;
    moving in a straight line;
    moving along a road;
    changing lanes;
    following a sidewalk associated with the road;
    crossing a crosswalk associated with the road; or
    jaywalking relative to the crosswalk and across the road.

6. A method comprising:
    receiving sensor data from one or more sensors;
    determining, based at least in part on a portion of the sensor data, an object in an environment;
    determining, based at least in part on the sensor data, one or more attributes of the object, wherein an attribute of the one or more attributes comprises a probability distribution indicating one or more probabilities that the object is associated with one or more classes of objects;
    generating, based at least in part on the one or more attributes and a prediction model, a set of intents corresponding to a set of candidate trajectories;
    determining, based at least in part on the one or more attributes, a candidate trajectory of the set of candidate trajectories, the candidate trajectory corresponding to an intent of the object; and
    determining a vehicle trajectory along which a vehicle is to drive based at least in part on the intent of the object.

7. The method as claim 6 recites, wherein the one or more attributes further comprise:
    a position of the object;
    an orientation of the object;
    a heading of the object;
    a velocity of the object;
    an acceleration of the object;
    an extent of the object; or
    a semantic attribute associated with the object.

8. The method as claim 6 recites, wherein the one or more classes include at least one of a vehicle class, a pedestrian class, or a bicycle class.

9. The method as claim 6 recites, further comprising accessing map data associated with a map of the environment, wherein the one or more attributes further comprise at least a portion of the map data.

10. The method as claim 6 recites, further comprising associating, based at least in part on the one or more attributes, one or more weights with the set of candidate trajectories.

11. The method as claim 10 recites, wherein associating the one or more weights with the set of candidate trajectories is based at least in part on a machine learned model.

12. The method as claim 6 recites, wherein the set of intents of the object comprises:
    staying stationary;
    moving in a straight line;
    moving along a road;
    changing lanes;
    following a sidewalk associated with the road;
    crossing a crosswalk associated with the road; or
    jaywalking relative to the crosswalk and across the road.

13. The method as claim 6 recites, further comprising refining a subset of the set of candidate trajectories based at least in part on determining one or more motion profiles.

14. The method as claim 6 recites, further comprising, associating, based at least in part on the one or more attributes, one or more weights with the set of candidate trajectories, wherein the weights are smoothed according to a probabilistic temporal smoothing model.

15. The method as claim 6 recites, wherein the vehicle is an autonomous vehicle, and the method further comprises executing, by a computing device associated with the autonomous vehicle, the vehicle trajectory to cause the autonomous vehicle to drive along the vehicle trajectory.

16. A non-transitory computer-readable medium having a set of instructions that, when executed, cause one or more processors to perform operations comprising:
   receiving, from one or more sensors, sensor data associated with an environment;
   determining, based at least in part on the sensor data, an object in the environment;
   determining, based at least in part on the sensor data, a plurality of attributes of the object or the environment, wherein an attribute of the plurality of attributes comprises a distribution of confidence scores indicating levels of confidence that the object is associated with individual classes of one or more classes of objects;
   determining, based at least in part on the plurality of attributes and a machine learned model, a set of intents of the object corresponding to a set of candidate trajectories;
   associating a set of weights with the set of candidate trajectories;
   selecting, based at least in part on the set of weights associated with the set of candidate trajectories, one or more candidate trajectories of the set of candidate trajectories; and
   determining, based at least in part on the one or more candidate trajectories, a vehicle trajectory along which a vehicle is to drive.

17. The non-transitory computer-readable medium as claim 16 recites, wherein the plurality of attributes further comprise at least one of:
   a position of the object;
   an orientation of the object;
   a heading of the object;
   a velocity of the object;
   an acceleration of the object;
   an extent of the object;
   a semantic attribute associated with the object; or
   a semantic attribute associated with the environment.

18. The non-transitory computer-readable medium as claim 16 recites, the operations further comprising accessing map data associated with a map of the environment, wherein the plurality of attributes further comprises the map data and the map data comprises at least one of semantic features, static structures, or road topologies.

19. The non-transitory computer-readable medium as claim 16 recites, the operations further comprising smoothing the set of weights based at least in part on a probabilistic temporal smoothing model.

20. The non-transitory computer-readable medium as claim 16 recites, wherein the set of intents comprise:
   staying stationary;
   moving in a straight line;
   moving along a road;
   changing lanes;
   following a sidewalk associated with the road;
   crossing a crosswalk associated with the road; or
   jaywalking relative to the crosswalk and across the road.

* * * * *